US012355657B2

(12) United States Patent
He

(10) Patent No.: US 12,355,657 B2
(45) Date of Patent: Jul. 8, 2025

(54) MESSAGE SENDING METHOD, MESSAGE RECEIVING METHOD, ELECTRONIC DEVICE, MESSAGE SENDING AND RECEIVING SYSTEM, AND STORAGE MEDIUM

(71) Applicant: ZTE CORPORATION, Shenzhen (CN)

(72) Inventor: Jianjun He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 369 days.

(21) Appl. No.: 17/907,303

(22) PCT Filed: Jun. 17, 2021

(86) PCT No.: PCT/CN2021/100634
§ 371 (c)(1),
(2) Date: Sep. 26, 2022

(87) PCT Pub. No.: WO2021/254441
PCT Pub. Date: Dec. 23, 2021

(65) Prior Publication Data
US 2023/0107833 A1    Apr. 6, 2023

(30) Foreign Application Priority Data
Jun. 18, 2020  (CN) .................. 202010559331.4

(51) Int. Cl.
*H04L 45/12* (2022.01)
*H04L 47/34* (2022.01)

(52) U.S. Cl.
CPC ............ *H04L 45/123* (2013.01); *H04L 47/34* (2013.01)

(58) Field of Classification Search
None
See application file for complete search history.

(56) References Cited

U.S. PATENT DOCUMENTS 7,120,149 B2 * 10/2006 Salamat .................. H04L 47/10
370/474
7,751,336 B2 * 7/2010 Hopps .................... H04L 45/02
370/242

(Continued)

FOREIGN PATENT DOCUMENTS

CN   101237462 A   8/2008
CN   101741725 A   6/2010

(Continued)

OTHER PUBLICATIONS

International Searching Authority. International Search Report and Written Opinion for PCT Application No. PCT/CN2021/100634 and English translation, mailed Sep. 23, 2021, pp. 1-9.

(Continued)

*Primary Examiner* — Khaled M Kassim
*Assistant Examiner* — Ahmed Saifuddin
(74) *Attorney, Agent, or Firm* — Vivacqua Crane, PLLC

(57) ABSTRACT

Disclosed are a packet sending method, a packet receiving method, an electronic device, a packet sending and receiving system, and a storage medium. The packet sending method may include: acquiring a current sequence number of a current link-state packet; generating a link-state packet with a transition sequence number according to the current sequence number, the link-state packet with the transition sequence number is newer than a link-state packet with a maximum sequence number and older than a link-state packet with an initial sequence number; and sending the link-state packet with the transition sequence number.

9 Claims, 5 Drawing Sheets

(56) References Cited

U.S. PATENT DOCUMENTS

| | | | |
|---|---|---|---|
| 10,044,626 B2* | 8/2018 | Underwood | H04L 47/27 |
| 10,382,323 B1* | 8/2019 | Dave | H04L 45/50 |
| 10,798,634 B2* | 10/2020 | Kang | H04L 45/20 |
| 2006/0245429 A1* | 11/2006 | Luong | H04L 45/02 370/394 |
| 2007/0115989 A1* | 5/2007 | Mirtorabi | H04L 45/02 370/392 |

FOREIGN PATENT DOCUMENTS

| | | | |
|---|---|---|---|
| CN | 102739543 A | 10/2012 | |
| CN | 102916875 A | 2/2013 | |
| CN | 103152263 A | 6/2013 | |
| WO | 2016123938 A1 | 8/2016 | |

OTHER PUBLICATIONS

European Patent Office. Extended European Search Report for EP Application No. 21826960.3, mailed Jun. 27, 2023, pp. 1-10.
Oran, D., "OSI IS-IS Intra-domain Routing Protocol," Internet Engineering Task Force (IETF) Standard, Feb. 1990, pp. 1-670.

* cited by examiner

MESSAGE SENDING METHOD, MESSAGE RECEIVING METHOD, ELECTRONIC DEVICE, MESSAGE SENDING AND RECEIVING SYSTEM, AND STORAGE MEDIUM

CROSS-REFERENCE TO RELATED APPLICATION

This application is a national stage filing under 35 U.S.C. § 371 of international application number PCT/CN2021/100634, filed Jun. 17, 2021, which claims priority to Chinese patent application No. 202010559331.4, filed Jun. 18, 2020. The contents of these applications are incorporated herein by reference in their entirety.

TECHNICAL FIELD

The present application relates the technical field of communication technology, and more particularly, to a packet sending method, a packet receiving method, an electronic device, a packet sending and receiving system, and a storage medium.

BACKGROUND

In a link-state routing algorithm, a local router utilizes link-state packets in a database to construct a Shortest Path First (SPF) tree, and finally calculates an optimal path to each destination address. Generally, a sequence number field is used to distinguish new and old instances of link-state packets. A sequence number of a link-state packet generated for the first time is an initial sequence number. The larger the sequence number is, the newer the link-state packet is. In order to ensure the robustness, a link-state routing algorithm protocol may regularly refresh a link-state packet, and a sequence number of a link-state packet newly generated may be increased by one on the basis of the previous link-state packet sequence number. When the sequence number reaches a maximum sequence number and a newer instance may be generated, since a next sequence number is the initial sequence number, which is older than the maximum sequence number, ideally, it may wait until all link-state packets with maximum sequence numbers in a network to be aged and deleted before a new link-state packet with an initialization sequence number can be generated.

In some situations in this field, the following two methods are generally adopted in the process of link-state packet sequence number flip. The first method is to suspend a routing service and wait for a preset duration (generally corresponding to a maximum lifetime of a link-state packet) before a new link-state packet with an initialization sequence number is generated, but this method has the problem that the routing service is unavailable during the waiting time. The second method is to age a link-state packet with a maximum sequence number in advance, but this method may cause a problem of route oscillation.

SUMMARY

Embodiments of the present application provide a packet sending method, a packet receiving method, an electronic device, a packet sending and receiving system, and a storage medium.

In accordance with an aspect of the present application, an embodiment provides a packet sending method, the method including: acquiring a current sequence number of a current link-state packet; generating a link-state packet with a transition sequence number according to the current sequence number, where the link-state packet with the transition sequence number is newer than a link-state packet with a maximum sequence number and older than a link-state packet with an initial sequence number; and sending the link-state packet with the transition sequence number.

In accordance with another aspect of the present application, an embodiment further proposes a packet receiving method, the method including: receiving a link-state packet with a transition sequence number sent by an external router, where the link-state packet with the transition sequence number is newer than a link-state packet with a maximum sequence number and older than a link-state packet with an initial sequence number; and processing the link-state packet as a link-state packet which is newer than a link-state packet with a sequence number within a second preset range.

In accordance with yet another aspect of the present application, an embodiment provides an electronic device, including a memory, a processor, and a computer program stored in the memory and executable by the processor, where the program, when executed by the processor, causes the processor to carry out the packet sending method described above, or the packet receiving method described above.

In accordance with yet another aspect of the present application, an embodiment further proposes a packet sending and receiving system, including at least one first electronic device and at least one second electronic device. The first electronic device includes a first memory, a first processor and a computer program stored in the first memory and executable by the first processor, where the program, when executed by the first processor, causes the first processor to carry out the packet sending method described above. Correspondingly, the second electronic device includes a second memory, a second processor and a computer program stored in the second memory and executable by the second processor, where the program, when executed by the second processor, causes the second processor to carry out the packet receiving method described above.

In accordance with yet another aspect of the present application, an embodiment further provides a computer-readable storage medium storing computer executable instructions, where the computer executable instructions are configured to: carry out the packet sending method described above, or carry out the packet receiving method described above.

Other features and advantages of the present application will be set forth in the following description, and partly become apparent from the description, or understood by implementing the present application. The objects and other advantages of the present application can be realized and obtained by the structure particularly pointed out in the description, claims and drawings.

DETAILED DESCRIPTION

Figure 1:
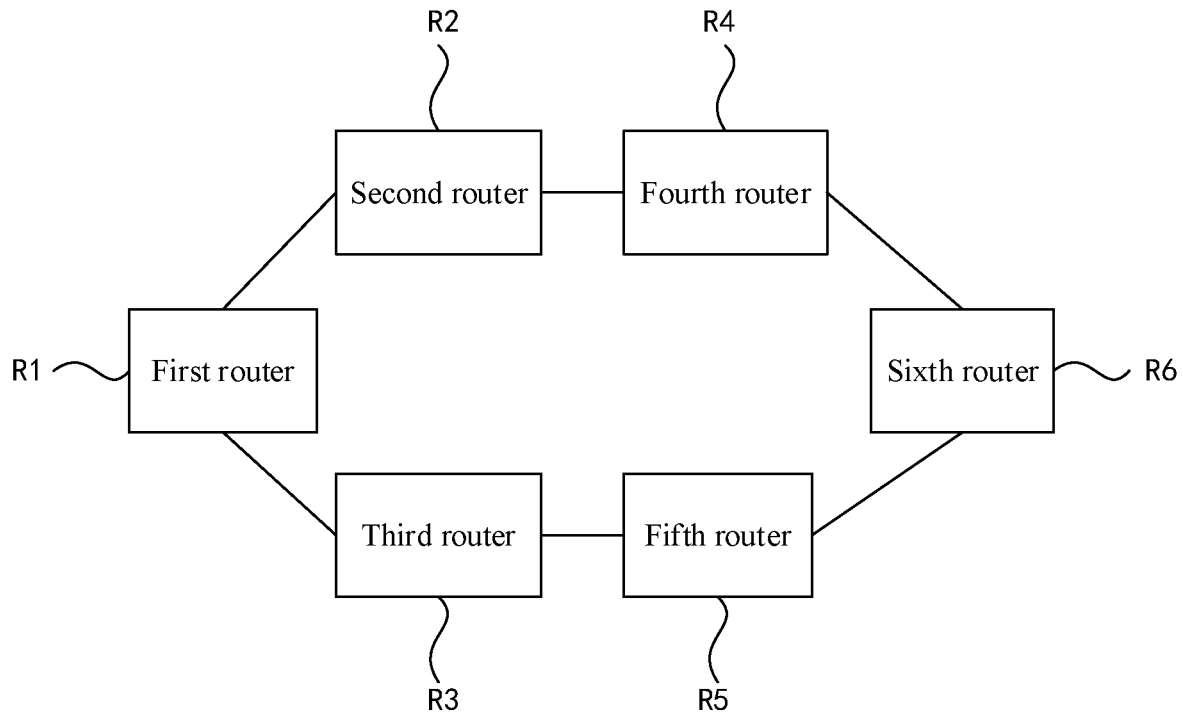
FIG. 1 is a schematic diagram of communication connection of a plurality of devices according to an embodiment of the present application.

It should be understood that the embodiments described here are only used to explain the present application, and are not used to limit the present application.

In the following description, terms such as "module", "component" or "unit" used to represent elements is merely intended to facilitate description of the present application, and the suffix itself is not intended to give any special meaning. Therefore, "module", "component" or "unit" can be used in a mixed way.

A link-state routing algorithm is one of dynamic routing protocols, including but not limited to: Open Shortest Path First (OSPF), and Intermediate System-to-Intermediate System (ISIS). In the link-state routing algorithm, neighbor devices are discovered by sending and receiving HELLO packets, and then Link-state Database (LSDB) synchronization is performed between neighbors. After the LSDB synchronization is completed, a local router utilizes link-state packets in a database to construct a Shortest Path First (SPF) tree, and finally calculates an optimal path to each destination address. Generally, a sequence number field is used to distinguish new and old instances of link-state packets. A sequence number of a link-state packet generated for the first time is an initial sequence number. The larger the sequence number is, the newer the link-state packet is. In order to ensure the robustness, a link-state routing algorithm protocol may regularly refresh a link-state packet, and a sequence number of a link-state packet newly generated will be increased progressively on the basis of the previous link-state packet sequence number. When the sequence number reaches a maximum sequence number and a newer packet may be generated, since a next sequence number is the initial sequence number, which is older than the maximum sequence number, ideally, it may wait for all link-state packets with maximum sequence numbers in a network to be aged (that is, the link-state packet reaches the maximum lifetime) and deleted before a new link-state packet with an initialization sequence number can be generated.

In this scenario, the ISIS protocol adopts a method of suspending the work to take effect to complete the flip of packet sequence numbers, where the duration of suspending to take effect is a maximum lifetime of a link-state packet. After the maximum lifetime is reached, an ISIS instance starts to take effect again, and then a new link-state packet with an initialization sequence number is generated. Apparently, the biggest problem of this method is that an ISIS service is unavailable during the suspension period, which has a huge impact. In contrast, the OSPF protocol adopts aging a link-state packet with a maximum sequence number in advance. When all neighbors receive the aged link-state packet with the maximum sequence number and reply an acknowledgement packet, a link-state packet with an initial sequence number will be generated. However, because only the acknowledgement packet from neighbors about the aged link-state packet with the maximum sequence number is received, when the link-state packet with the initial sequence number is generated and transmitted, there may still be link-state packets with maximum sequence numbers in the network. According to an existing sequence number comparison rule, an old link-state packet with a maximum sequence number is newer than the newly generated link-state packet with the initial sequence number, so a problem of route oscillation is caused due to the fact that the link-state packet is constantly aged and refreshed.

As shown in FIG. 1, in the OSPF protocol, when link-state packet sequence numbers are flipped, a problem of route oscillation caused due to the fact that the link-state packet is continuously aged and refreshed may occur. At present, a sequence number of a link-state packet generated by a first router R1 is a maximum sequence number. When may need to refresh the link-state packet, the first router R1 ages the link-state packet with the maximum sequence number and sets the age to 3600, that is, sets a current lifetime of the link-state packet to a maximum lifetime, and sends the link-state packet with the maximum sequence number to a second router R2 and a third router R3. The second router R2 and the third router R3 receive the link-state packet with the maximum sequence number having an age of 3600, and reply acknowledgement packets to the first router R1. The first router R1 receives the acknowledgement packets from the second router R2 and the third router R3, deletes the link-state packet with the maximum sequence number having an age of 3600, regenerates a link-state packet with an initial sequence number and sends the link-state packet with the initial sequence number to the second router R2 and the third router R3. At this time, if a fourth router R4 and a fifth router R5 have not sent acknowledgement packets to the second router R2 and the third router R3, databases of the second router R2 and the third router R3 have link-state packets with maximum sequence numbers having an age of 3600. The second router R2 and the third router R3 receive the link-state packet with the initial sequence number newly generated by the first router R1, and send the packet with the maximum sequence number to the first router R1 upon considering that the link-state packet with the maximum sequence number having an age of 3600 is newer than the link-state packet with the initial sequence number newly generated by the first router R1 according to an existing rule. After deleting the link-state packet with the maximum sequence number having an age of 3600, the first router R1 re-generates a link-state packet with an initial sequence number. As long as the link-state packet with the maximum sequence number having an age of 3600 has not been aged and deleted from the network, this process will be repeated continuously, and a path router will have an oscillation process of receiving valid information and then deleting valid information, that is, the route will oscillate continuously.

Based on this, the embodiments of the present application provide a packet sending method, a receiving method, an electronic device, a packet sending and receiving system, and a storage medium, to smoothly transition sequence numbers when sequence numbers of link-state packets are flipped and effectively solve the problem of route oscillation caused due to the fact that the link-state packet is continuously aged and refreshed in the flip process of a current sequence number.

It should be noted that in the following various embodiments, the electronic device may be a router or other electronic devices with routing functions. The following description only takes the electronic device being a router as an example.

Figure 2:
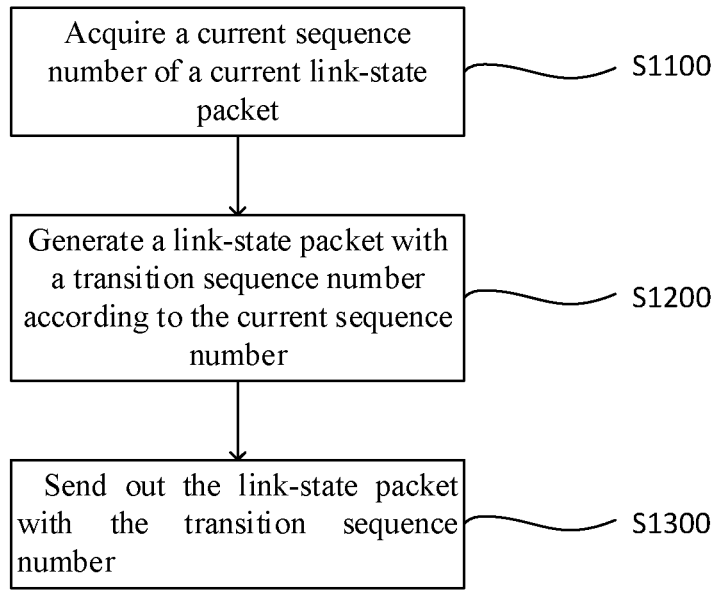
FIG. 2 is a flowchart of a packet sending method according to an embodiment of the present application.

In accordance with an aspect of the present application, as shown in FIG. 2, an embodiment provides a packet sending method applied to an electronic device with a routing function. The method includes following steps of S1100 to S1300

At S1100, a current sequence number of a current link-state packet is acquired.

At S1200, a link-state packet with a transition sequence number is generated according to the current sequence number, where the link-state packet with the transition sequence number is newer than a link-state packet with a maximum sequence number and older than a link-state packet with an initial sequence number.

In some embodiments, according to the current sequence number, that is, the sequence number of the current link-state packet, it is determined whether the sequence number of the current link-state packet is a maximum sequence number. If the sequence number of the current link-state packet is the maximum sequence number, a link-state packet with a transition sequence number is generated, and in this case, the link-state packet with the transition sequence number is transmitted or updated as a normal link-state packet. If the sequence number of the current link-state packet is not the maximum sequence number, a link-state packet with a transition sequence number is not required to be generated, the sequence number is not required to be flipped, a normal link-state packet update process is performed, that is, the link-state routing algorithm protocol periodically refreshes the link-state packet, and the sequence number of the newly generated link-state packet is increased progressively on the basis of the previous link-state packet sequence number.

The transition sequence number set enables a maximum sequence number and a minimum sequence number of a packet to be connected. In one embodiment, the link-state packet with the transition sequence number is newer than the link-state packet with the maximum sequence number and older than the link-state packet with the initial sequence number, that is, when the link-state routing algorithm periodically refreshes the link-state packet, the sequence number of the newly generated link-state packet will be increased progressively on the basis of the previous link-state packet sequence number, for example, will reach the maximum when the packet sequence number is 3500. In this case, it may generate a new sequence number packet from an initial sequence number 1. By setting the transition sequence number in advance and defining that the transition sequence number is newer than the maximum sequence number 3500 and older than the minimum sequence number, when the packet is updated, a next update of the maximum sequence number 3500 is an instance of a packet with the transition sequence number, and then an initial sequence number of 1 may be generated when the update is carried out again. For example, corresponding transition sequence numbers in the OSPF protocol and the ISIS protocol may be set to 0X80000000 and 0, respectively.

At S1300, the link-state packet with the transition sequence number is sent out.

In some embodiments, if the sequence number of the current link-state packet is a maximum sequence number, a link-state packet with the transition sequence number is generated, stored in a database and flooded out.

The practical application of the packet sending method according to the embodiment of the present application is explained by taking the following example that a sequence number of a link-state packet reaches the maximum sequence number and may be flipped.

Figure 3:
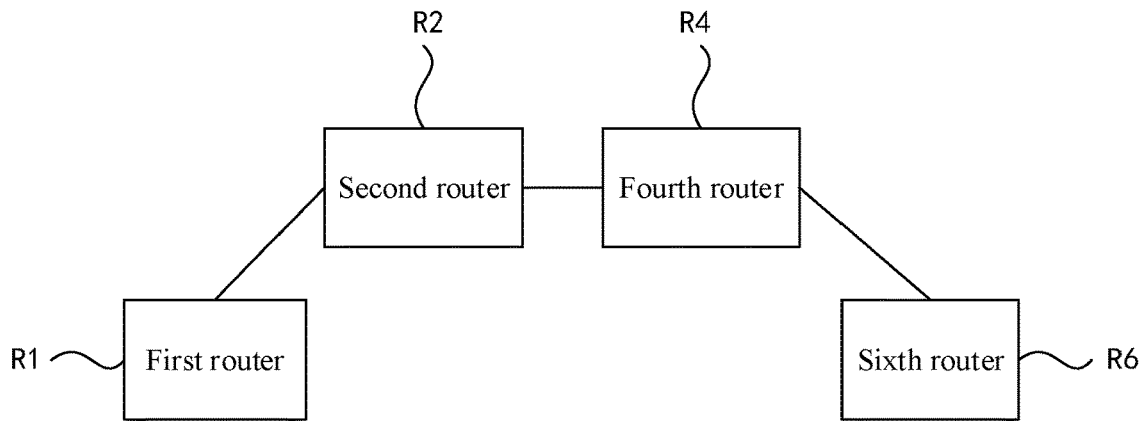
FIG. 3 is a schematic diagram of communication connection of a plurality of devices according to another embodiment of the present application.

As shown in FIG. 3, four devices in a network include a first router R1, a second router R2, a fourth router R4 and a sixth router R6, and the devices may be router devices. Taking the link-state packet being an OSPF packet as an example, the OSPF uses a Link-State Packet (LSA) to describe a network topology. The router stores all received LSAs in a database in the OSPF, the database being called Link-state Database (LSDB). Each link-state packet contains: a router ID, which is an ID of an OSPF router that generates the packet; a sequence number, where a field of the sequence number is used to distinguish old and new instances of link-state packets, that is, multiple link-state packets of the same router device, the sequence number of the link-state packet generated for the first time is an initial sequence number, the larger the sequence number is, the newer the link-state packet is, when a new instance is generated every time, the sequence number of the packet is increased progressively, when the router receives multiple instances about the same LSA, the sequence number is used to help the router identify the latest instance; and a lifetime, in seconds, indicating the time elapsed since LSA came into being. The maximum lifetime of the LSA is 3600 seconds, and the refresh time is 1800 seconds. The LSA should be cleared from the LSDB after 3600 seconds. In general, the presence of LSA in the LSDB for more than 1800 seconds is considered abnormal.

First, a sequence number of a link-state packet of the first router R1 is acquired. When the sequence number of the link-state packet of the first router R1 reaches a maximum value and a new flipped link-state packet may be generated, due to network reasons, the situations where each device in the current network has a link-state packet instance of the first router R1 are as follows: the second router R2 replies an acknowledgement packet of a link-state packet with a maximum sequence number having an age of 3600 to the first router R1, and the second router R2 successfully sends the link-state packet with the maximum sequence number having an age of 3600 to the fourth router R4. However, the second router R2 has not received an acknowledgement packet from the fourth router R4, and the fourth router R4 has not yet sent the link-state packet with the maximum sequence number having an age of 3600 to the sixth router R6.

Then, the first router R1 generates a link-state packet with a sequence number which is a transition sequence number. The second router R2 receives the link-state packet with the transition sequence number, stores the packet in a database, and sends the packet to the fourth router R4. The fourth router R4 receives the link-state packet with the transition sequence number, and determines that a sequence number of an instance of the link-state packet of the local first router R1 is smaller than the transition sequence number. Therefore, the fourth router R4 considers that the link-state packet with the transition sequence number is newer, stores the link-state packet with the transition sequence number in a local database, and sends the link-state packet with the transition sequence number to the sixth router R6.

Similarly, the sixth router R6 determines that the sequence number of the instance of the link-state packet of the local first router R1 is smaller than the transition sequence number, and therefore considers that the link-state packet with the transition sequence number is newer, and stores the link-state packet with the transition sequence number in a local database. So far, all the databases of all routers have stored the instance of the link-state packet with the transition sequence number of the first router R1, and there is no problem of route oscillation caused due to the fact that the link-state packet is constantly aged occurs in the process of link-state packet interaction.

Therefore, according to the embodiment of the present application, the sequence number of the packet can be smoothly transitioned by sending a packet with a transition sequence number, effectively solving the problem of route oscillation caused due to the fact that the packet is continuously aged and refreshed in the flip process of a current sequence number.

Because it takes a long time for a sequence number of a dynamic link-state packet to reach a maximum sequence number, when the sequence number reaches the maximum sequence number and a new link-state packet with an initial sequence number may be generated, a router may do not need transition sequence number capability, that is, the router may only follow a normal sequence number update process before sequence number flip is performed. Therefore, the transition sequence number capability of the router can be controlled to enabled or disabled by setting a transition sequence number capability switch.

In some embodiments, the packet sending method according to the embodiment of the present application further includes following steps S1400 to S1410.

At S1400, a state of the transition sequence number capability switch is acquired.

In some embodiments, the state of the transition sequence number capability switch includes ON and OFF. If the transition sequence number capability switch is turned on, it indicates that a device starts to support generating and processing a link-state packet with a transition sequence number. The transition sequence number capability switch may be set on a router device. If the state of the transition sequence number capability switch is set to ON, it indicates that the router device starts to support generating and processing the link-state packet with the transition sequence number. If the transition sequence number capability switch is not turned on, the transition sequence number is a reserved sequence number and cannot be used as a normal sequence number, so the link-state packet with the transition sequence number is generally discarded when being received.

At S1410, if the state of the transition sequence number capability switch is OFF, the transition sequence number capability switch is turned on.

In some embodiments, after the transition sequence number capability switch is turned on, a current sequence number of a current link-state packet is acquired. According to the current sequence number and the state of the transition sequence number capability switch, a link-state packet with a transition sequence number is generated, and then sent out.

During a period before a sequence number of a packet of a router reaches a maximum sequence number from an initial sequence number, that is, before the sequence number is flipped, the router device may only follow the normal sequence number update process, and may does not need the transition sequence number capability. By setting the transition sequence number capability switch, program computing resources can be saved.

The transition sequence number capability switch may be turned on by manually setting parameters of the transition sequence number switch, or may be automatically turned on by program setting. In some embodiments, by acquiring the current sequence number of the current link-state packet, if the current sequence number is within a first preset range, the transition sequence number capability switch is turned on. In other words, after a sequence number of a link-state packet of a current router device reaches the first preset range, the router device starts to support processing the link-state packet with the transition sequence number.

In some embodiments, it is to consider the processing of the current router device performed on a self-generated link-state packet with a transition sequence number and the processing of the current router device performed on a received link-state packet with a transition sequence number. For example, if a sequence number of a current link-state packet of a certain router device in a network reaches the first preset range first, the transition sequence number capability switch is turned on first. However, sequence numbers of packets of other router devices in the network have not reached the first preset range, so the transition sequence number capability is not enabled. At this time, other router devices cannot process the received link-state packet with the transition sequence number. Therefore, it is to turn on the transition sequence number capability switch by determining that the current sequence number of the link-state packet with the maximum sequence number in the local database reaches the first preset range, so that all devices in the network can simultaneously support processing the link-state packet with the transition sequence number, to complete the flip process of the link-state packet.

In some embodiments, turning on the transition sequence number capability switch by determining the current sequence number of the link-state packet with the maximum sequence number in the local database includes following steps:

acquiring a current sequence number of a link-state packet with a maximum sequence number in a local database, and if the current sequence number is within a first preset range, turning on the transition sequence number capability switch. In some embodiments, a current sequence number of a link-state packet with a maximum sequence number in a current database is acquired, and if the current sequence number is within a first preset range, the transition sequence number capability switch is turned on. The transition sequence number capability switch may be turned on by determining that the maximum sequence number of the link-state packet in the local database reaches the first preset range, so that a router device starts to support processing the received link-state packet with the transition sequence number.

In some embodiments, the first preset range is a value between a preset intermediate sequence number and the maximum sequence number. The preset intermediate sequence number may be a first preset proportion*the maximum sequence number. For example, when the first preset proportion is 90%, the first preset range is [maximum sequence number*90%, maximum sequence number], that is, when the current packet sequence number is within the range of [maximum sequence number*90%, maximum sequence number], the transition sequence number capability switch is turned on.

The preset intermediate sequence number may also be set to a fixed value according to an empirical value. For example, the preset intermediate sequence number is set to a value 1000 less than the maximum sequence number, that is, when the current packet sequence number is within the range of [maximum sequence number−1000, maximum sequence number], the transition sequence number capability switch can be turned on to perform sequence number flip. By determining whether the current sequence number is within the first preset range, the state of the transition sequence number capability switch is set, so that manual monitoring of the change in sequence number is eliminated, making the efficiency higher. By setting the transition sequence number capability switch to be automatically turned on, it is avoided that when the transition sequence number capability switch is always in the ON state, transition sequence number judgement is required to be performed on all link-state packets, thus saving device program computing resources.

Figure 4:
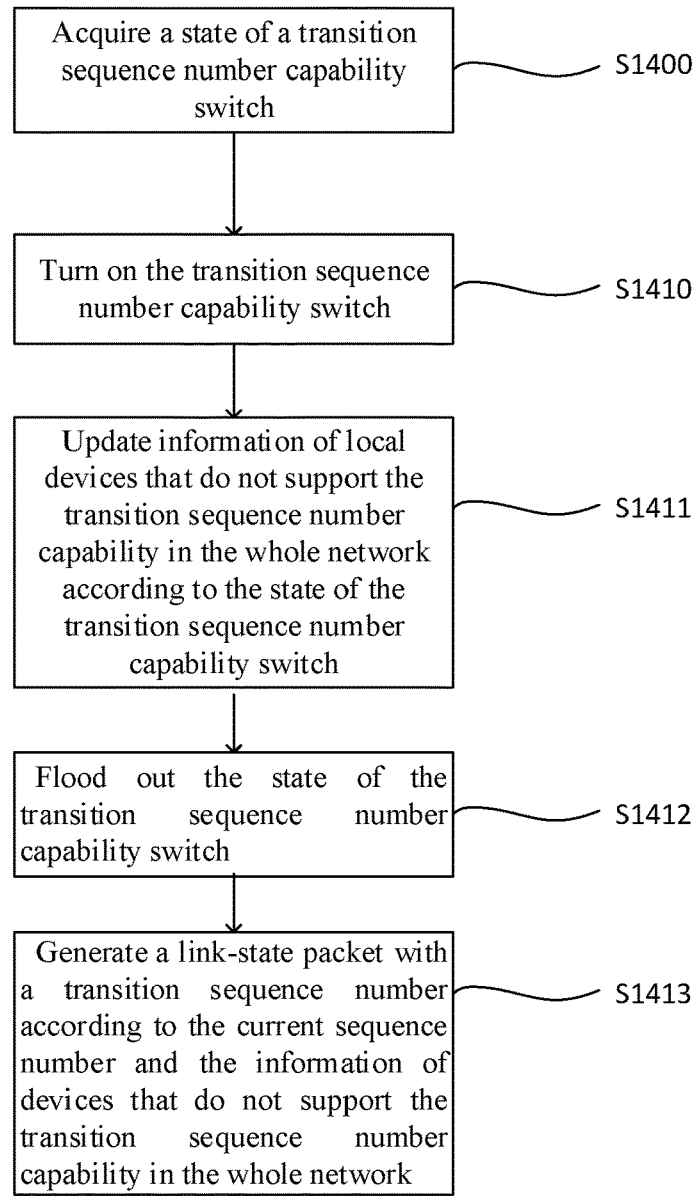
FIG. 4 is a flowchart of a packet sending method according to another embodiment of the present application.

In some embodiments, if not all the transition sequence number capability switches of devices in the whole network are turned on simultaneously, an error may be caused when generating and processing the transition sequence number capability. For example, if each transition sequence number capability switch is manually set, there will be a delay in turning on the transition sequence number capability switch of each router in the network, or when the transition sequence number capability switch is automatically turned on, a delay or failure in turning on the transition sequence number capability switch due to network reasons may cause that not all the transition sequence number capability switches of the devices in the whole network are turned on simultaneously, so an error may be caused when generating and processing the transition sequence number capability. Therefore, in some embodiments, the packet sending method proposed according to the embodiment of the present application, as shown in FIG. 4, further includes following steps S1400 to S1413.

At S1400, a state of the transition sequence number capability switch is acquired.

At S1410, the transition sequence number capability switch is turned on.

At S1411, information of local devices that do not support the transition sequence number capability in the whole network is updated according to the state of the transition sequence number capability switch.

In some embodiments, updating information of local devices that do not support the transition sequence number capability in the whole network according to the state of the transition sequence number capability switch includes: determining whether a device is in the information of local devices that do not support the transition sequence number capability in the whole network;
  if the device is in a list of devices that do not support the transition sequence number capability in the whole network, deleting a record of this device from the information of devices that do not support the transition sequence number capability in the whole network, and externally sending a notification packet that the transition sequence number capability is supported; and if the device is not in the information of devices that do not support the transition sequence number capability in the whole network, externally sending a notification packet that the transition sequence number capability is supported.

In some embodiments, the notification packet that the transition sequence number capability is supported can use a single capability notification packet, or can reuse an option flag bit in an existing link-state packet (that is, a flag bit in the link-state packet is used to send the notification packet that the transition sequence number capability is supported), and the aging of a capability notification packet or the cancellation of flag bit setting respectively corresponds to the notification packet that the transition sequence number capability is not supported. A mode of using a single capability notification packet may be implemented in the OSPF using a capability notification packet, and may be implemented in the ISIS using a TLV field in a PDU packet.

In some embodiments, the transition sequence number capability supported by all devices in the whole network is set on a router device, the information of devices that do not support the transition sequence number capability in the whole network is a list, it is determined whether a record in the list of devices that do not support the transition sequence number capability in the whole network is empty, if yes, the transition sequence number capability supported by all devices in the whole network is set to TRUE; otherwise, no processing is made.

At S1412, the state of the transition sequence number capability switch is flooded out, so that other devices can update the information of devices that do not support the transition sequence number capability in the whole network of a corresponding device according to the state of the transition sequence number capability switch.

In some embodiments, updating, by other devices, the information of devices that do not support the transition sequence number capability in the whole network of a corresponding device according to the switch state of the transition sequence number capability includes:
  receiving a notification packet that the transition sequence number capability is supported sent by other devices;
  if a notification packet that the transition sequence number capability is supported is received and a device is in a list of devices that do not support the transition sequence number capability in the whole network, deleting a record of this device from the list of devices that do not support the transition sequence number capability in the whole network; and if the device is not in the list of devices that do not support the transition sequence number capability in the whole network, making no processing;
  if a notification packet that the transition sequence number capability is not supported is received, determining whether the transition sequence number capability is supported by all devices in the whole network is TRUE:
  if the transition sequence number capability being supported by all devices in the whole network is TRUE, adding a packet sender to the information of devices that do not support the transition sequence number capability, and setting the transition sequence number capability being supported by all devices in the whole network as FALSE; and
  if the transition sequence number capability being supported by all devices in the whole network is FALSE, adding the packet sender to the information of devices that do not support the transition sequence number capability.

At S1413, a link-state packet with a transition sequence number is generated according to the current sequence number and the information of devices that do not support that the transition sequence number capability in the whole network.

In some embodiments, the information of devices that do not support the transition sequence number capability in the whole network may be an information list, which records the information of devices that do not support the transition sequence number capability in the whole network, that is, information of devices whose transition sequence number capability is disabled. By sending and receiving a packet with a transition sequence number, the information of devices that do not support the transition sequence number capability in the whole network can be updated, and states of all devices in the whole network supporting the transition sequence number capability can be confirmed synchronously. When the states of all devices in the whole network supporting the transition sequence number capability are enabled, packets with transition sequence numbers can be processed normally in the whole network.

In some embodiments, when a state of a device transition sequence number capability switch is OFF, a processing method for a link-state packet with a transition sequence number includes following steps:

acquiring a state of a transition sequence number capability switch; and if the state of the transition sequence number capability switch is OFF, and a current sequence number of a current link-state packet is a maximum sequence number, generating a link-state packet with an initial sequence number.

In some embodiments, when a state of a transition sequence number capability switch of a device is OFF, and a sequence number of a current link-state packet is a maximum sequence number, a normal flip process is performed, to generate a link-state packet with an initialization sequence number is generated, and the link-state packet with the initialization sequence number is stored in a database and flooded out to ensure the accuracy of packet processing by the device (router).

Figure 5:
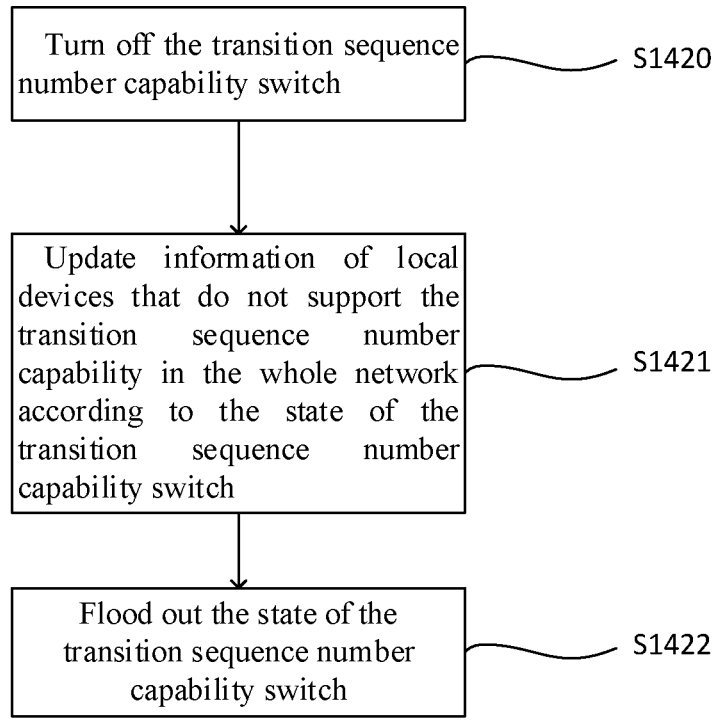
FIG. 5 is a flowchart of a packet sending method according to another embodiment of the present application.

In some embodiments, when the transition sequence number capability switch is turned off, updating the information of devices that do not support the transition sequence number capability in the whole network, as shown in FIG. 5, includes steps S1420 to S1422.

At S1420, the transition sequence number capability switch is turned off.

At S1421, information of local devices that do not support the transition sequence number capability in the whole network is updated according to the state of the transition sequence number capability switch.

In some embodiments, when the state of the transition sequence number capability switch of this device is OFF, the transition sequence number capability being supported by all devices in the whole network is set as FALSE, and it is determined whether the information of this device exists in the information of devices that do not support the transition sequence number capability in the whole network, if not, the information of this device is added to the information of devices that do not support the transition sequence number capability.

At S1422, the state of the transition sequence number capability switch is flooded out, so that other devices can update the information of devices that do not support the transition sequence number capability in the whole network of a corresponding device according to the state of the transition sequence number capability switch.

In some embodiments, the state of the transition sequence number capability switch is flooded out to externally send a notification packet that the transition sequence number capability is not supported, so that other devices can update the information of devices that do not support the transition sequence number capability in the whole network of a corresponding device according to the state of the transition sequence number capability switch, and the corresponding device distinguishes whether the packet is the link-state packet of this device according to a router ID.

By sending the notification packet that the transition sequence number capability is not supported, other devices can synchronously update the information of devices that do not support the transition sequence number capability in the whole network of a corresponding device, so that the state that the transition sequence number capability is supported in the whole network is more accurate.

When a device may no longer need to enable a transition sequence number capability function, the transition sequence number capability function can be disabled. Disabling the transition sequence number capability function includes following steps:

turning off the transition sequence number capability switch, setting the transition sequence number capability being supported by all devices in the whole network as FALSE, and adding the device to the information of devices that do not support the transition sequence number capability;

externally sending a notification packet that the transition sequence number capability is not supported; and if the information of devices that do not support the transition sequence number capability in the whole network is not empty, and a current sequence number of a current link-state packet is a maximum sequence number, generating a link-state packet with an initial sequence number.

In some embodiments, if the information of devices that do not support the transition sequence number capability in the whole network is not empty, and a current sequence number of a current link-state packet is a maximum sequence number, it indicates that the sequence number of the link-state packet reaches the maximum in the case where the transition sequence number capability is supported, and it is to perform sequence number flip, so a normal process of sequence number flip is performed, and the link-state packet with the initial sequence number is generated, stored in a database and flooded out.

Figure 6:
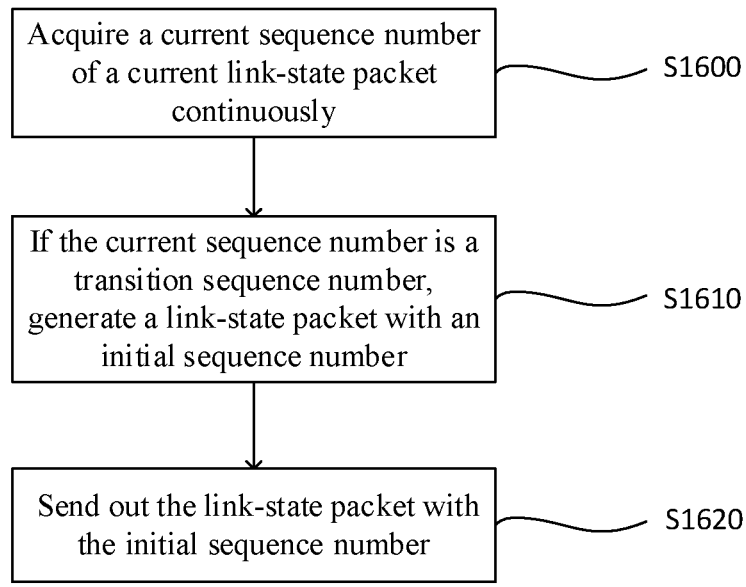
FIG. 6 is a flowchart of a packet sending method according to another embodiment of the present application.

In some embodiments, as shown in FIG. 6, the packet sending method further includes S1600 to S1620.

At S1600, a current sequence number of a current link-state packet is continued to be acquired.

At S1610, if the current sequence number is a transition sequence number, a link-state packet with an initial sequence number is generated.

In some embodiments, if there is a link-state packet with a transition sequence number and the link-state packet is a self-generated link-state packet, the link-state packet is updated to generate a link-state packet with an initial sequence number, and the link-state packet with the initial sequence number is stored in a database. If there is a link-state packet with a transition sequence number but the link-state packet is not a self-generated link-state packet, the link-state packet with the transition sequence number is aged and flooded out.

At S1620, the link-state packet with the initial sequence number is sent out.

Figure 7:
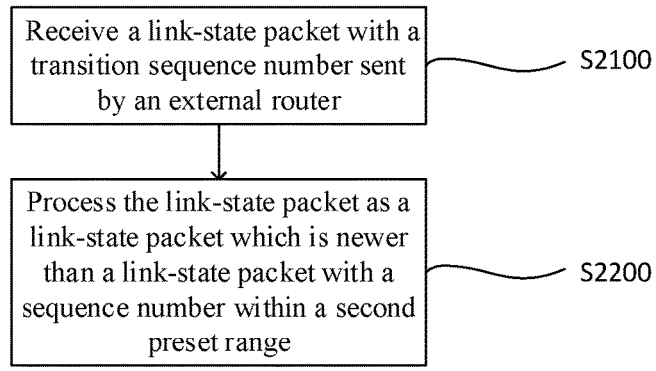
FIG. 7 is a flowchart of a packet receiving method according to an embodiment of the present application.

In some embodiments, when a device supports generating and sending a packet with a transition sequence number, the packet with the transition sequence number can be processed as a normal packet. When the packet with the transition sequence number may need to be updated like a normal packet or the lifetime is over, the device may continue to generate a link-state packet with an initial sequence number as an updated packet instance of the packet with the transition sequence number, and update the packet by the link-state packet with the initial sequence number and send the link-state packet with the initial sequence number to complete packet sequence number flip In accordance with another aspect of the present application, as shown in FIG. 7, an embodiment provides a packet receiving method, the method including following steps S2100 to S2200.

At S2100, a link-state packet with a transition sequence number sent by an external router is received.

In some embodiments, when a device receives a link-state packet, it is determined whether a sequence number of the link-state packet is a transition sequence number. If the sequence number of the link-state packet is not a transition sequence number, an existing processing flow of receiving the link-state packet is performed.

The link-state packet with the transition sequence number is newer than a link-state packet with a maximum sequence number and older than a link-state packet with an initial sequence number.

At S2200, the link-state packet is processed as a link-state packet which is newer than a link-state packet with a sequence number within a second preset range.

In some embodiments, if the sequence number of the link-state packet is a transition sequence number, it is determined whether there is a corresponding link-state packet instance in a local database.

If there is a corresponding link-state packet instance in the local database, and a sequence number of a local link-state packet instance falls within a preset sequence number range, that is, the sequence number of the local link-state packet instance is older than the sequence number of the received link-state packet, it indicates that the link-state packet with the transition sequence number is newer, and the received link-state packet with the transition sequence number is regarded as a latest link-state packet.

If there is no corresponding link-state packet instance in the local database, it indicates that the link-state packet with the transition sequence number is newer, and a processing flow of receiving the newer link-state packet is performed.

Therefore, according to the embodiment of the present application, the packet sequence number can be smoothly transitioned by receiving a packet with a transition sequence number and processing the link-state packet as a link-state packet which is newer than the link-state packet with the sequence number within the second preset range, thus effectively solving the problem of route oscillation caused due to the fact that the packet is continuously aged and refreshed in the flip process of a current sequence number.

Figure 8:
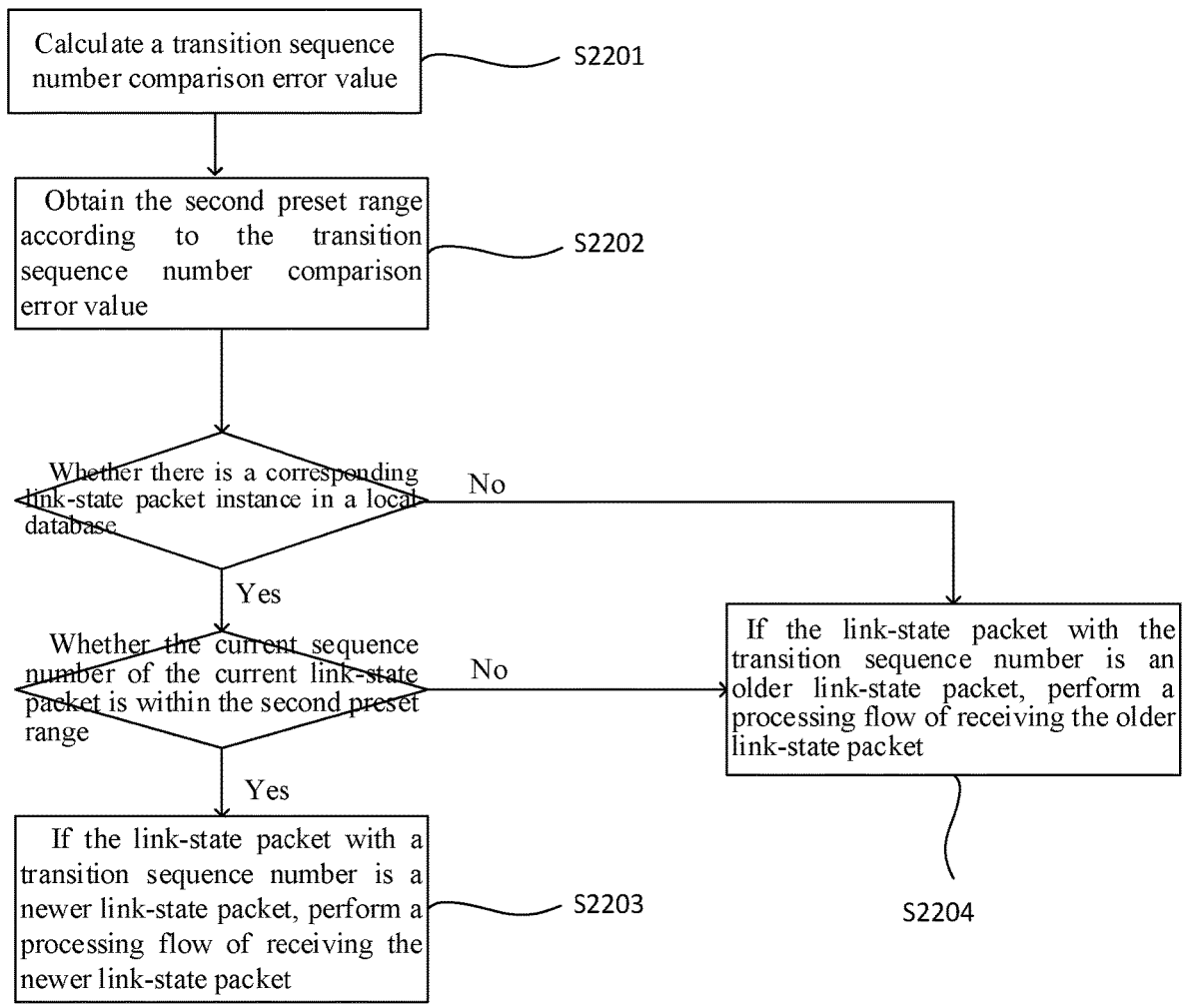
FIG. 8 is a flowchart of a packet receiving method according to another embodiment of the present application.
Figure 9:
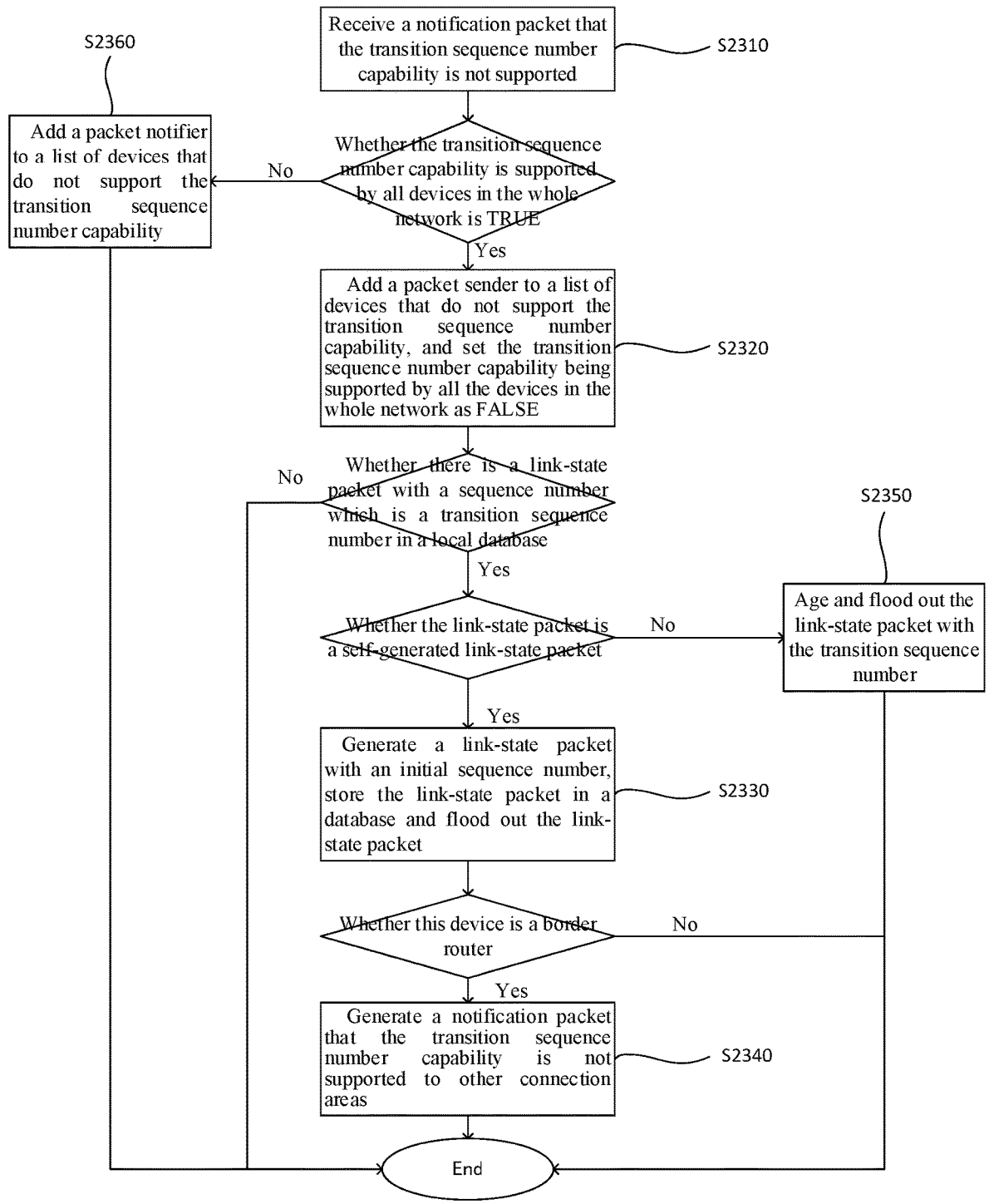
FIG. 9 is a flowchart of a packet receiving method according to another embodiment of the present application.

In some embodiments, processing the link-state packet as a link-state packet which is newer than the link-state packet with the sequence number within the second preset range, as shown in FIG. 8, includes following steps S2201 to S2204.

At S2201, a transition sequence number comparison error value is calculated.

In some embodiments, due to network transmission reasons, there may be multiple different instances of a certain link-state packet in the network. In the worst case, there may be multiple instances of a maximum network diameter. To solve this problem, a transition sequence number comparison error value is introduced in the embodiment of the present application. The transition sequence number comparison error value may be a network diameter, denoted as Dmax, and can be calculated by means of the Shortest Path First (SPF) algorithm.

In some embodiments, a calculation process of the transition sequence number comparison error value is as follows: initializing a whole network diameter Dmax to 0, starting to traverse all areas/levels of a device instance, running the SPF calculation algorithm in each area/level, where all link cost values are 1 by default in the calculation process, constructing a shortest path tree of the area, calculating a maximum distance from a root node to a leaf node as Hmax, and finally taking a maximum Hmax value in all areas/levels as Dmax. In an example, as shown in FIG. 3, taking a network including four devices (a first router R1, a second router R2, a fourth router R4, and a sixth router R6) as an example, the four devices in the network are communicatively connected in sequence, and transition sequence number capability functions of all the four devices are enabled, to externally send a notification packet that the transition sequence number capability is supported. The network diameters Dmax of the shortest path tree calculated by the first router R1, the second router R2, the fourth router R4 and the sixth router R6 are 3, 2, 2 and 3, respectively. In some embodiments, the transition sequence number comparison error value may be set to the whole network diameter Dmax by static configuration, which can reduce the complexity of dynamic calculation.

At S2202, the second preset range is obtained according to the transition sequence number comparison error value.

In some embodiments, the second preset range obtained according to the transition sequence number comparison error value is [maximum sequence number−transition sequence number comparison error value+1, maximum sequence number]. In some embodiments, due to network delay or other network transmission reasons, there may be multiple different instances of a certain link-state packet in the network, which are often related to the network diameter Dmax, so the second preset range may be calculated according to the whole network diameter Dmax. For example, if the transition sequence number comparison error value is set to network diameter Dmax, the second preset range is [maximum sequence number−Dmax+1, maximum sequence number]. In an example, as shown in FIG. 3, taking a network including four devices (a first router R1, a second router R2, a fourth router R4, and a sixth router R6) as an example, the four devices in the network are communicatively connected in sequence, and transition sequence number capability functions of all the four devices are enabled, to externally send a notification packet that the transition sequence number capability is supported. The network diameters Dmax of the shortest path tree calculated by the first router R1, the second router R2, the fourth router R4 and the sixth router R6 are 3, 2, 2 and 3, respectively. The second preset range in the first router R1 is: [maximum sequence number−Dmax+1, maximum sequence number]= [maximum sequence number−3+1, maximum sequence number]=[maximum sequence number−2, maximum sequence number]. The second preset range in the second router R2 is: [maximum sequence number−Dmax+1, maximum sequence number]=[maximum sequence number−2+1, maximum sequence number]=[maximum sequence number−1, maximum sequence number]. The second preset range in the third router R3 is: [maximum sequence number−Dmax+1, maximum sequence number]=[maximum sequence number−2+1, maximum sequence number]= [maximum sequence number−1, maximum sequence number]. The second preset range in the fourth router R4 is: [maximum sequence number−Dmax+1, maximum sequence number]=[maximum sequence number−3+1, maximum sequence number]=[maximum sequence number−2, maximum sequence number]. The second preset range is obtained by the maximum sequence number and calculation of the transition sequence number comparison error value. Thus, the problem that there may be multiple different instances of a certain link-state packet in the network due to network delay or network transmission reasons can be solved, so that the device can process the link-state packet with the sequence number within the second preset range in time according to the transition sequence number capability, thereby ensuring the smooth flip of the link-state packet sequence number.

It is determined whether there is a corresponding link-state packet instance in a local database, if yes:
  it is determined whether the current sequence number of the current link-state packet stored in the local database is within the second preset range, if yes, step S2203 is executed; otherwise, step S2204 is executed.

At 2203, if the link-state packet with a transition sequence number is a newer link-state packet, a processing flow of receiving the newer link-state packet is performed.

In some embodiments, if the sequence number of a local link-state packet instance is within the range of [maximum sequence number−Dmax+1, maximum sequence number], the link-state packet with the transition sequence number is a newer link-state packet, and a processing flow of receiving the newer link-state packet is performed.

At S2204, if the link-state packet with the transition sequence number is an older link-state packet, a processing flow of receiving the older link-state packet is performed.

In some embodiments, if the sequence number of the local link-state packet instance is not within the range of [maximum sequence number−Dmax+1, maximum sequence number], the link-state packet with the transition sequence number is an older link-state packet, and a processing flow of receiving the older link-state packet is performed, that is, the lifetime of the transition sequence number has not yet expired, but a new sequence number increased progressively from the initial sequence number has been generated. Then, in this case, the transition sequence number is an older packet sequence number, and the device will use the link-state packet with the new sequence number to send and update information.

If there is no corresponding link-state packet instance in the local database, the link-state packet with the transition sequence number is newer, and a processing flow of receiving the newer link-state packet is performed.

In some embodiments, the processing flow in which a device receives a packet that the transition sequence number capability is supported includes a following step:
  receiving a state of the transition sequence number capability switch.

In some embodiments, when receiving a notification packet that the transition sequence number capability is supported which is sent by a neighbor device, it is determined whether a packet notifier is in the information of devices that do not support the transition sequence number capability.

If the packet notifier is in the information of devices that do not support the transition sequence number capability, in some embodiments, the information of devices that do not support the transition sequence number capability is a list, the packet notifier is deleted from the list of devices that do not support the transition sequence number capability, and it is further determined whether the list of devices that do not support the transition sequence number capability is empty, if yes, the transition sequence number capability being supported by all devices in the whole network is set to be TRUE, otherwise, no processing is made.

If the packet notifier is not in the list of devices that do not support the transition sequence number capability, no processing is made.

According to the state of the transition sequence number capability switch, the link-state packet is processed as a link-state packet which is newer than a link-state packet with a sequence number within a second preset range.

In some embodiments, when a device receives a link-state packet, it is determined whether a sequence number of the link-state packet is a transition sequence number.

If the sequence number of the link-state packet is not the transition sequence number, an existing processing flow of receiving the link-state packet is performed.

If the sequence number of the link-state packet is the transition sequence number, it is further determined whether the transition sequence number capability is supported by all devices in the whole network is TRUE; if yes, it is further determined whether there is a corresponding link-state packet instance in the local database.

If there is a corresponding link-state packet instance in the local database and a sequence number of a local link-state packet instance is within the range of [maximum sequence number−Dmax+1, maximum sequence number], the link-state packet with the transition sequence number is a newer link-state packet, and a processing flow of receiving the newer link-state packet is performed; if there is a corresponding link-state packet instance in the local database but the sequence number of the local link-state packet instance is not within the range of [maximum sequence number−Dmax+1, maximum sequence number], the link-state packet is an older link-state packet, and the processing flow of receiving the older link-state packet is performed.

If there is no corresponding link-state packet instance in the local database, the link-state packet with the transition sequence number is a newer link-state packet, and a processing flow of receiving the newer link-state packet is performed.

If the transition sequence number capability being supported by all devices in the whole network is FALSE, an acknowledgement packet is replied, and the link-state packet with the transition sequence number is discarded.

In some embodiments, when a notification packet that the transition sequence number capability is not supported is received, a link-state packet with a transition sequence number is generated according to the current sequence number and the information of devices that do not support the transition sequence number capability in the whole network, as shown in FIG. 8, including following steps S2310 to S2360.

At S2310, a notification packet that the transition sequence number capability is not supported is received;

It is determined whether the transition sequence number capability is supported by all devices in the whole network is TRUE; if yes, step S2320 is executed; otherwise, step S2360 is executed.

At S2320, a packet sender is added to a list of devices that do not support the transition sequence number capability, and the transition sequence number capability being supported by all the devices in the whole network is set to FALSE.

It is determined whether there is a link-state packet with a sequence number which is a transition sequence number in a local database, if yes:
  it is determined whether the link-state packet is a self-generated link-state packet, that is, a link-state packet generated by this router device. If the link-state packet is a self-generated link-state packet, step S2330 is executed; otherwise, step S2350 is executed.

At S2330, a link-state packet with an initial sequence number is generated, stored in a database and flooded out.

It is determined whether this device is a border router; if yes, step S2340 is executed.

At S2340, a notification packet that the transition sequence number capability is not supported is generated to other connected areas.

In some embodiments, the border router is a router located on the border of one or more OSPF areas and connecting these areas to a backbone network, that is, the border router is regarded as a member device of both OSPF backbone and connected areas. In addition, the border router maintains routing information tables describing the backbone topology and other area topologies at the same time. Therefore, when this device is a border router, it is to send a notification packet of the transition sequence number capability to other connected areas, so that the routing information table can be updated in other connected areas to simultaneously support processing packets with transition sequence numbers.

If this device is not a border router, a notification packet that the transition sequence number capability is not supported is not generated to other connected areas.

If there is a link state packet with a sequence number which is a transition sequence number in the local database but the link-state packet is not a self-generated link-state packet, S2350 is performed.

At S2350, the link-state packet with the transition sequence number is aged and flooded out.

If there is no link-state packet with the transition sequence number in the local database, no processing is made.

At S2360, the packet notifier is added to the list of devices that do not support the transition sequence number capability.

A notification packet of the transition sequence number capability. When a router receives a notification packet that the transition sequence number capability is supported, the information of devices that do not support the transition sequence number capability is synchronously updated, and the transition sequence number capability being supported by all devices in the whole network is set as TRUE, so that a state that the transition sequence number capability is supported in the whole network is more accurate and the link-state packet with the transition sequence number is processed more effectively. When the router receives a notification packet that the transition sequence number capability is not supported, the information of devices that do not support the transition sequence number is synchronously updated, and the transition sequence number capability being supported by all devices in the whole network is set as FALSE. If the sequence number of the packet currently received is the transition sequence number, the packet is aged and flooded out, so that packet is newer and more accurate.

In accordance with yet another aspect of the present application, an embodiment provides a packet sending and receiving method, including:

the packet sending method described above; and the packet receiving method described above.

In some embodiments, the packet sending and receiving method includes: the packet sending method described in steps S1100 to S1300 in the embodiment described above; and the packet receiving method described in steps S2100 to S2200 in the embodiment described above.

In accordance with yet another aspect of the present disclosure, an embodiment provides an electronic device, including a memory, a processor, and a computer program stored in the memory and executable by the processor, where the program, when executed by the processor, causes the processor to carry out:

the packet sending method described above in the embodiment of the present application;

or, the packet receiving method described above in the embodiment of the present application.

In some embodiments, the electronic device may be a router or other electronic devices with routing functions.

In accordance with yet another aspect of the present disclosure, an embodiment provides a packet sending and receiving system, including at least one first electronic device and at least one second electronic device.

The first electronic device includes a first memory, a first processor and a computer program stored in the first memory and executable by the first processor, where the computer program, when executed by the first processor, causes the first processor to carry out the packet sending method in the embodiment described above.

Correspondingly, the second electronic device includes a second memory, a second processor, and a computer program stored in the second memory and executable by the second processor, where the computer program, when executed by the second processor, causes the second processor to carry out the packet receiving method described above.

In some embodiments, the overall processing flow of the present application is illustrated with an example. As shown in FIG. 3, all four devices in the network enable transition sequence number capability functions, and externally send a notification packet that the transition sequence number capability is supported, where the network diameters Dmax of the shortest path tree calculated by the first router R1, the second router R2, the fourth router R4 and the sixth router R6 are 3, 2, 2 and 3, respectively.

When the first router R1 may need to generate a new flipped link-state packet, due to network reasons, the situations where each device in the current network has a link-state packet instance of the first router R1 as follows: the second router R2 replies an acknowledgement packet of a link-state packet with a maximum sequence number having an age of 3600 to the first router R1, and the second router R2 successfully sends the link-state packet with the maximum sequence number having an age of 3600 to the fourth router R4. However, the fourth router R4 has not yet sent the link-state packet with the maximum sequence number having an age of 3600 to the router R6.

Then, the first router R1 generates a link-state packet with a sequence number which is a transition sequence number. The second router R2 receives the link-state packet with the transition sequence number, stores the packet in a database, and sends the packet to the fourth router R4. The fourth router R4 receives the link-state packet with the transition sequence number, and determines that a sequence number of an instance of the link-state packet of the local first router R1 is within the range of [maximum sequence number−1, maximum sequence number] (that is, [maximum sequence number−Dmax+1, maximum sequence number]=[maximum sequence number−2+1, maximum sequence number]). Therefore, the fourth router R4 considers that the link-state packet with the transition sequence number is newer, stores the link-state packet with the transition sequence number in a local database, and sends the link-state packet with the transition sequence number to the sixth router R6.

Similarly, the sixth router R6 determines that the sequence number of the instance of the link-state packet of the local first router R1 is within the range of [maximum sequence number−3+1, maximum sequence number], and therefore considers that the link-state packet with the transition sequence number is newer, and stores the link-state packet with the transition sequence number in a local database. So far, all the databases of all routers have stored the instance of the link-state packet with the transition sequence number of the first router R1, and no problem of route oscillation caused due to the fact of the previously described continuous aging occurs in the process of link-state packet interaction.

In accordance with yet another aspect of the present application, an embodiment provides a computer-readable storage medium storing computer executable instructions which, when executed by a processor, cause the processor to:
  carry out the packet sending method in the embodiment described above;
  or,
  carry out the packet receiving method in the embodiment described above.

In some embodiments, an embodiment of the present application provides a computer-readable storage medium storing computer executable instructions which, when executed by a processor, cause the processor to:
  carry out the packet sending method described in steps S1100 to S1300 in the embodiment described above; or carry out the packet receiving method described in steps S2100 to S2200 in the embodiment described above.

In accordance with the packet sending method, packet receiving method, electronic device, packet sending and receiving system and storage medium provided in the embodiments of the present application, a link-state packet with a transition sequence number is generated according to a current sequence number of a current link-state packet, where the link-state packet with the transition sequence number is newer than a link-state packet with a maximum sequence number and older than a link-state packet with an initial sequence number. In this way, when the sequence number of the link-state packet reaches the maximum and the sequence number may be flipped, the new and old sequences numbers can be updated through the link-state packet with the transition sequence number. Therefore, in this technical scheme, according to the link-state packet processing method provided, the sequence number can be smoothly transitioned, effectively solving the problem of route oscillation caused due to the fact that the link-state packet is continuously aged and refreshed in the flip process of a current sequence number.

As will be understood by those having ordinary skill in the art that all or some of the steps, systems and functional modules/units in the devices disclosed above may be implemented as software, firmware, hardware and appropriate combinations thereof.

In the hardware implementation, the division between functional modules/units mentioned in the above description does not necessarily correspond to the division of physical components. For example, a physical component may have multiple functions, or a function or step may be cooperatively performed by multiple physical components. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skill in the art, the term computer storage medium includes volatile and nonvolatile, removable and non-removable media implemented in any method or technology for storing information such as computer-readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, as is well known to those having ordinary skill in the art that the communication medium may generally include computer-readable instructions, data structures, program modules or other data in a modulated data signal such as a carrier wave or other transmission mechanism, and may include any information delivery medium.

Some embodiments of the present application are described above with reference to the drawings, and are not intended to limit the scope of protection of the present application. Any modification, equivalent replacement, and improvement made by those skilled in the art without departing from the scope and essence of the present application shall fall within the scope of protection of the present application.

The invention claimed is:

1. A packet sending method, comprising:
  acquiring a current sequence number of a current link-state packet;
  generating a link-state packet with a transition sequence number according to the current sequence number, wherein the link-state packet with the transition sequence number is newer than a link-state packet with a maximum sequence number and older than a link-state packet with an initial sequence number; and
  sending the link-state packet with the transition sequence number;
  turning on a transition sequence number capability switch;
  wherein generating a link-state packet with a transition sequence number according to the current sequence number comprises:
  generating a link-state packet with a transition sequence number according to the current sequence number and a state of the transition sequence number capability switch;
  wherein after turning on the transition sequence number capability switch, the method further comprises:
  updating information of local devices that do not support the transition sequence number capability in the whole network according to the state of the transition sequence number capability switch; and
  flooding out the state of the transition sequence number capability switch, so that other devices update the information of devices that do not support the transition sequence number capability in the whole network of a corresponding device according to the state of the transition sequence number capability switch;
  wherein generating a link-state packet with a transition sequence number according to the current sequence number and a state of a transition sequence number capability switch comprises:
  generating a link-state packet with a transition sequence number according to the current sequence number and the information of devices that do not support the transition sequence number capability in the whole network.

2. The packet sending method of claim 1, wherein turning on the transition sequence number capability switch comprises:
acquiring a current sequence number of a current link-state packet, and in response to the current sequence number being within a first preset range, turning on the transition sequence number capability switch; or
acquiring a current sequence number of a link-state packet with a maximum sequence number in a local database, and in response to the current sequence number being within a first preset range, turning on the transition sequence number capability switch.

3. The packet sending method of claim 1, further comprising:
acquiring the state of the transition sequence number capability switch; and
in response to the state of the transition sequence number capability switch being OFF, and the current sequence number of the current link-state packet being a maximum sequence number, generating a link-state packet with an initial sequence number.

4. The packet sending method of claim 1, further comprising:
turning off the transition sequence number capability switch;
updating information of local devices that do not support the transition sequence number capability in the whole network according to the state of the transition sequence number capability switch; and
flooding out the state of the transition sequence number capability switch, so that other devices update the information of devices that do not support the transition sequence number capability in the whole network of a corresponding device according to the state of the transition sequence number capability switch.

5. The packet sending method of claim 4, further comprising:
acquiring the information of devices that do not support the transition sequence number capability in the whole network; and
in response to the information of devices that do not support the transition sequence number capability in the whole network being not empty, and the current sequence number of the current link-state packet being the maximum sequence number, generating the link-state packet with the initial sequence number.

6. The packet sending method of claim 1, further comprising:
acquiring the current sequence number of the current link-state packet continuously;
in response to the current sequence number being a transition sequence number, generating the link-state packet with the initial sequence number; and
sending the link-state packet with the initial sequence number.

7. An electronic device, comprising:
a memory, a processor, and a computer program stored in the memory and executable by the processor which, when executed by the processor, causes the processor to carry out the packet sending method of claim 1.

8. A packet sending and receiving system, comprising at least one first electronic device and at least one second electronic device, wherein
the first electronic device includes a first memory, a first processor and a computer program stored in the first memory and executable by the first processor which, when executed by the first processor, causes the first processor to carry out a packet sending method, comprising:
acquiring a current sequence number of a current link-state packet;
generating a link-state packet with a transition sequence number according to the current sequence number, wherein the link-state packet with the transition sequence number is newer than a link-state packet with a maximum sequence number and older than a link-state packet with an initial sequence number; and
sending the link-state packet with the transition sequence number;
turning on a transition sequence number capability switch;
wherein generating a link-state packet with a transition sequence number according to the current sequence number comprises:
generating a link-state packet with a transition sequence number according to the current sequence number and a state of the transition sequence number capability switch;
wherein after turning on the transition sequence number capability switch, the method further comprises:
updating information of local devices that do not support the transition sequence number capability in the whole network according to the state of the transition sequence number capability switch; and
flooding out the state of the transition sequence number capability switch, so that other devices update the information of devices that do not support the transition sequence number capability in the whole network of a corresponding device according to the state of the transition sequence number capability switch;
wherein generating a link-state packet with a transition sequence number according to the current sequence number and a state of a transition sequence number capability switch comprises:
generating a link-state packet with a transition sequence number according to the current sequence number and the information of devices that do not support the transition sequence number capability in the whole network; and
the second electronic device includes a second memory, a second processor, and a computer program stored in the second memory and executable by the second processor which, when executed by the second processor, causes the second processor to carry out a packet receiving method, comprising:
receiving a link-state packet with a transition sequence number sent by an external router, wherein the link-state packet with the transition sequence number is newer than a link-state packet with a maximum sequence number and older than a link-state packet with an initial sequence number; and
processing the link-state packet as a link-state packet which is newer than a link-state packet with a sequence number within a second preset range.

9. A non-transitory computer-readable storage medium storing computer executable instructions which, when executed by a processor, causes the processor to carry out the packet sending method of claim 1.

* * * * *